(12) United States Patent
Le

(10) Patent No.: US 7,388,732 B2
(45) Date of Patent: Jun. 17, 2008

(54) PERPENDICULAR RECORDING MAGNETIC HEAD WITH A WRITE SHIELD MEGNETICALLY COUPLED TO A FIRST POLE PIECE

(75) Inventor: Quang Le, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 422 days.

(21) Appl. No.: 10/814,716

(22) Filed: Mar. 31, 2004

(65) Prior Publication Data

US 2005/0024771 A1 Feb. 3, 2005

Related U.S. Application Data

(63) Continuation-in-part of application No. 10/631,642, filed on Jul. 30, 2003, now Pat. No. 7,031,121.

(51) Int. Cl.
*G11B 5/147* (2006.01)

(52) U.S. Cl. .................................................. 360/126

(58) Field of Classification Search .................. 360/126
See application file for complete search history.

(56) References Cited

U.S. PATENT DOCUMENTS

| | | | |
|---|---|---|---|
| 4,321,641 A | 3/1982 | Lee ............................. | 360/126 |
| 4,656,546 A | 4/1987 | Mallory ...................... | 360/110 |
| 4,935,832 A | 6/1990 | Das et al. .................... | 360/112 |
| 4,967,298 A | 10/1990 | Mowry ........................ | 360/317 |
| RE33,949 E | 6/1992 | Mallary et al. .............. | 360/110 |
| 5,557,492 A | 9/1996 | Gill et al. .................... | 360/319 |
| 5,757,591 A | 5/1998 | Carr et al. .................... | 360/323 |
| 5,828,530 A | 10/1998 | Gill et al. .................... | 360/319 |
| 5,850,325 A | 12/1998 | Miyauchi et al. ............ | 360/319 |
| 6,025,977 A | 2/2000 | Hu et al. ...................... | 360/319 |
| 6,342,993 B1 | 1/2002 | Sato ............................ | 360/319 |
| 6,404,601 B1 | 6/2002 | Rottmayer et al. .......... | 360/317 |
| 6,414,824 B1 | 7/2002 | Sasaki ......................... | 360/317 |
| 6,762,911 B2* | 7/2004 | Sasaki et al. ................ | 360/126 |
| 6,922,316 B2* | 7/2005 | Sato et al. ................... | 360/317 |

(Continued)

OTHER PUBLICATIONS

A. S. Hoagland, High-Resolution Magnetic Recording Structures, IBM Journal of Research and Development, 1958 (2) pp. 90-104.

(Continued)

*Primary Examiner*—Julie Anne Watko
(74) *Attorney, Agent, or Firm*—David W. Lynch; Merchant & Gould

(57) ABSTRACT

A perpendicular recording write head has ferromagnetic first and second pole pieces which are connected at a back gap and an insulation stack with a write coil layer embedded therein is located between the first and second pole pieces and between a head surface of the write head and the back gap. The second pole piece has a pole tip, which is located at the head surface and a recessed ferromagnetic write shield layer. A nonmagnetic isolation layer is located between the second pole piece and the write shield layer and at least one ferromagnetic stud is magnetically connected between the first pole piece layer and the write shield layer and is located between the head surface and the insulation stack. The write pole formation is performed using ion milling.

10 Claims, 12 Drawing Sheets

U.S. PATENT DOCUMENTS

| | | | |
|---|---|---|---|
| 6,954,340 B2* | 10/2005 | Shukh et al. | 360/317 |
| 7,110,218 B2* | 9/2006 | Narumi et al. | 360/126 |
| 2002/0048125 A1 | 4/2002 | Macken et al. | 360/319 |
| 2002/0064003 A1 | 5/2002 | Kim et al. | 360/319 |
| 2002/0135937 A1* | 9/2002 | Sato et al. | 360/126 |
| 2005/0068678 A1* | 3/2005 | Hsu et al. | 360/126 |
| 2005/0083605 A1* | 4/2005 | Hu et al. | 360/125 |
| 2005/0162778 A1* | 7/2005 | Kimura et al. | 360/126 |
| 2006/0198050 A1* | 9/2006 | Mochizuki et al. | 360/126 |

OTHER PUBLICATIONS

M. Mallary, A. Torobi & M. Benaldi, One Terabit Pere Square Inch Perpendicular recording conceptual Design, IEEE Transactions on Magnetics, vol. 38, No. 4, Jul. 2002, pp. 17191724.

* cited by examiner

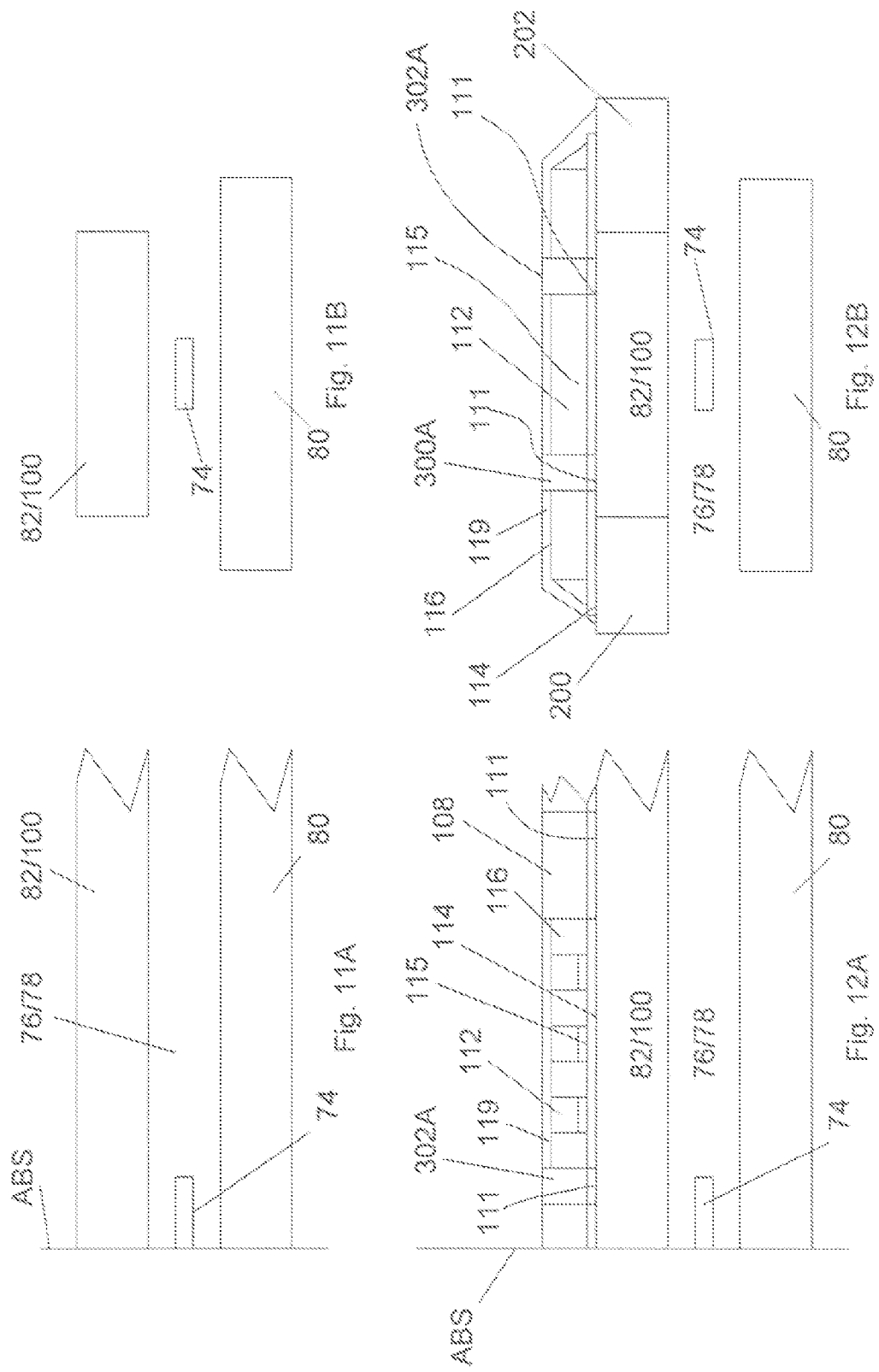

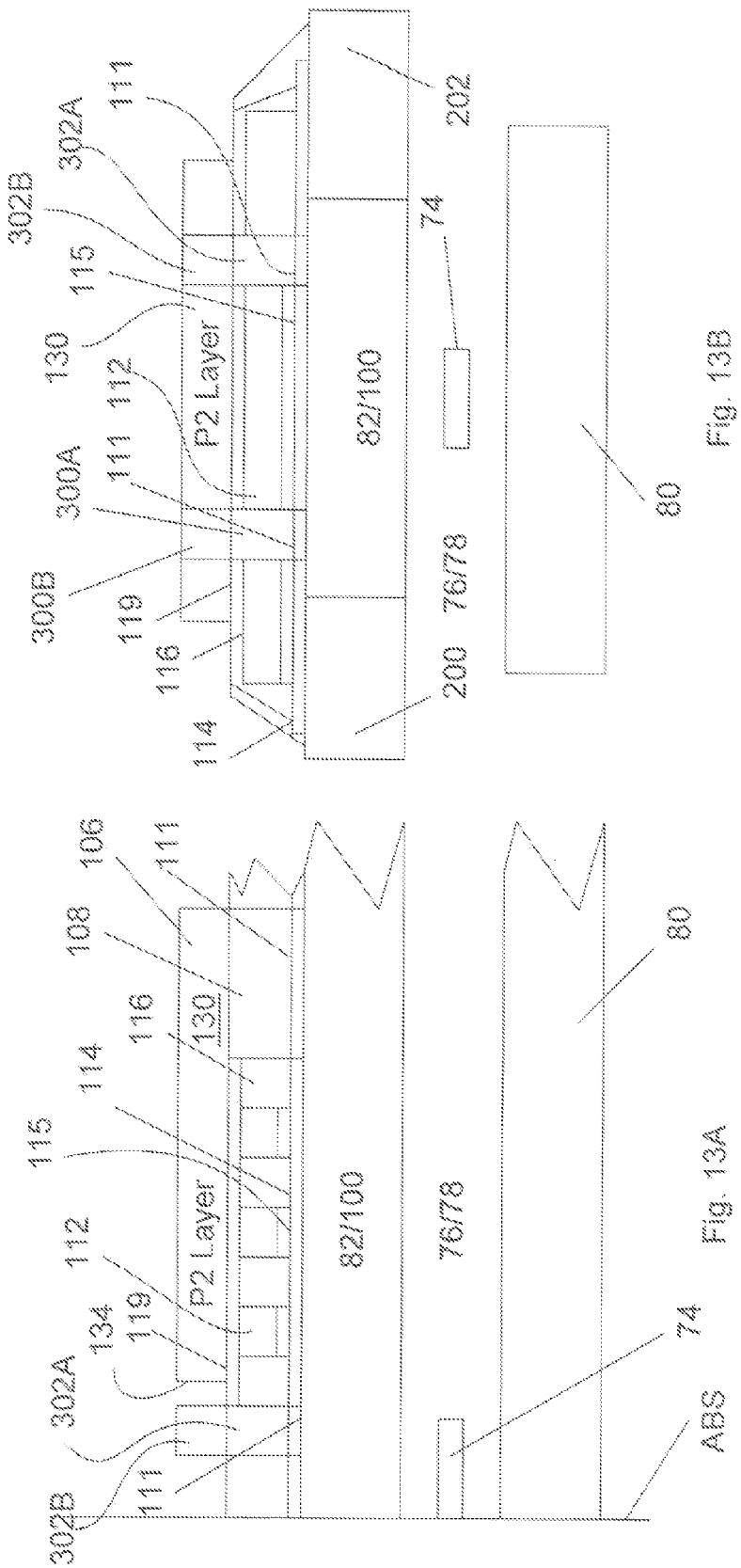

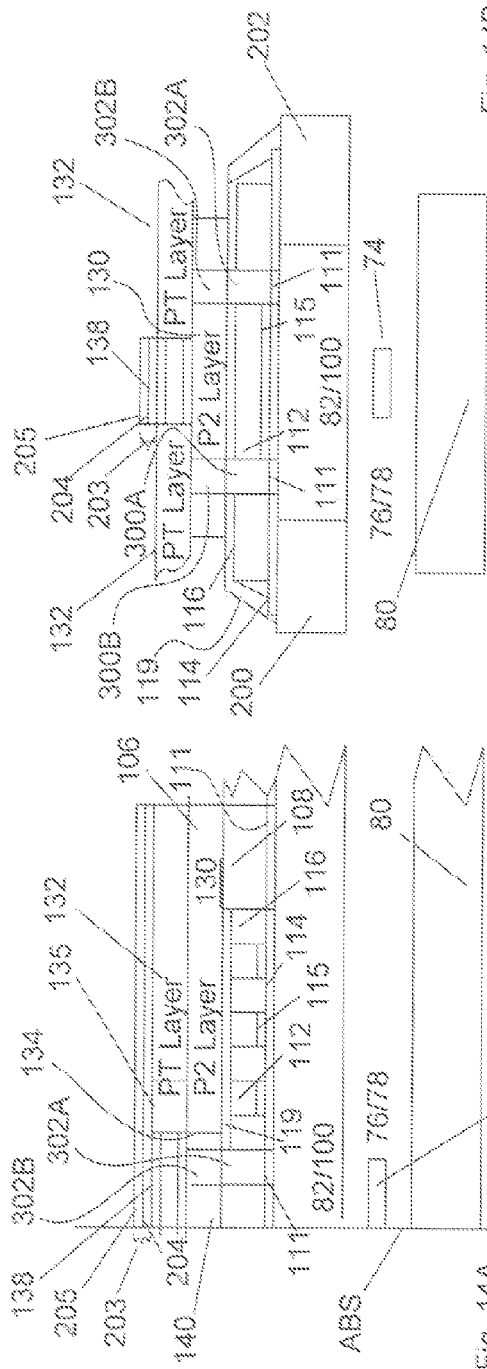
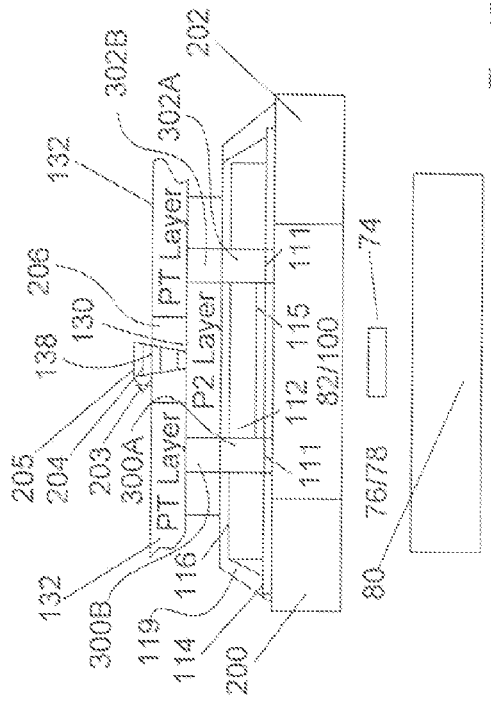
Fig. 14B
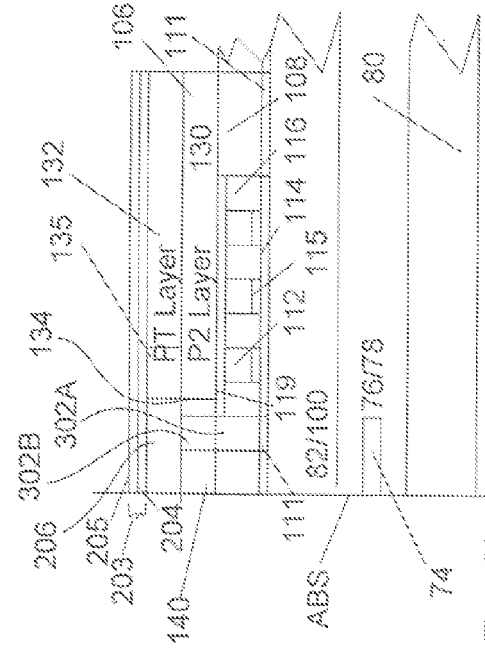
Fig. 15B
Fig. 14A
Fig. 15A

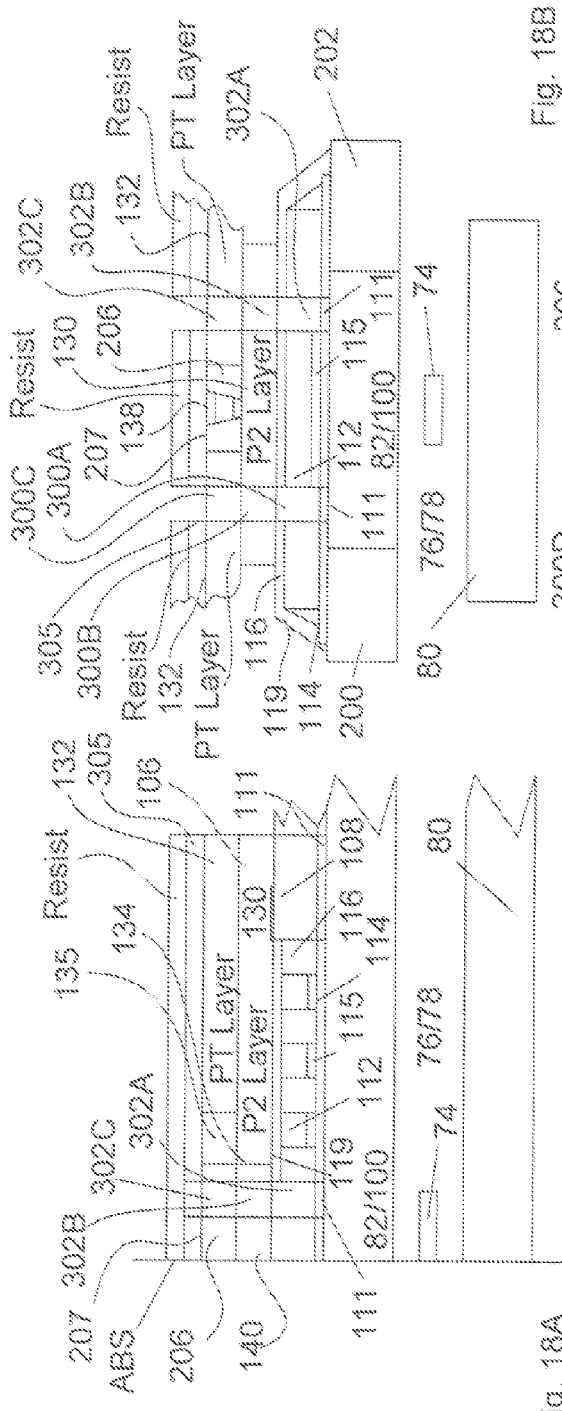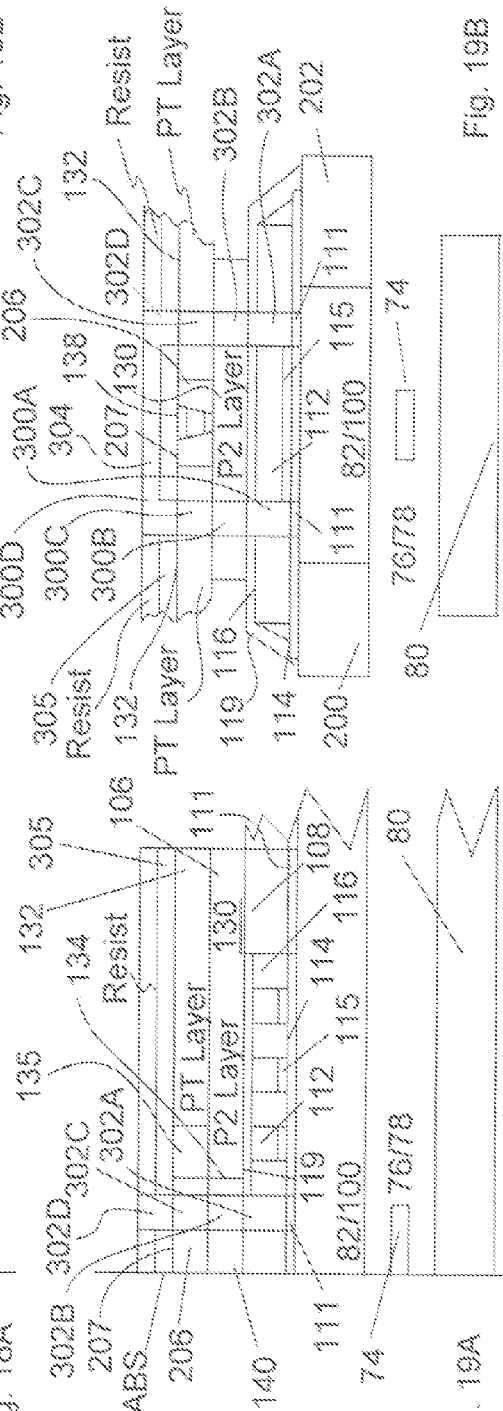

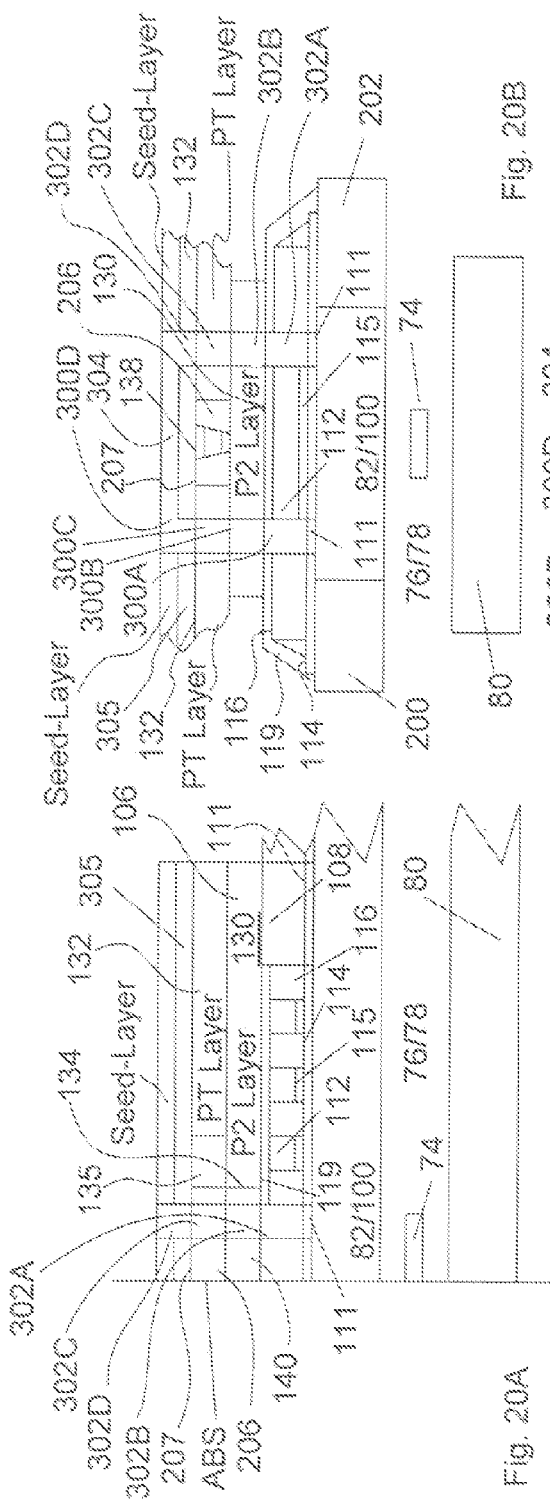
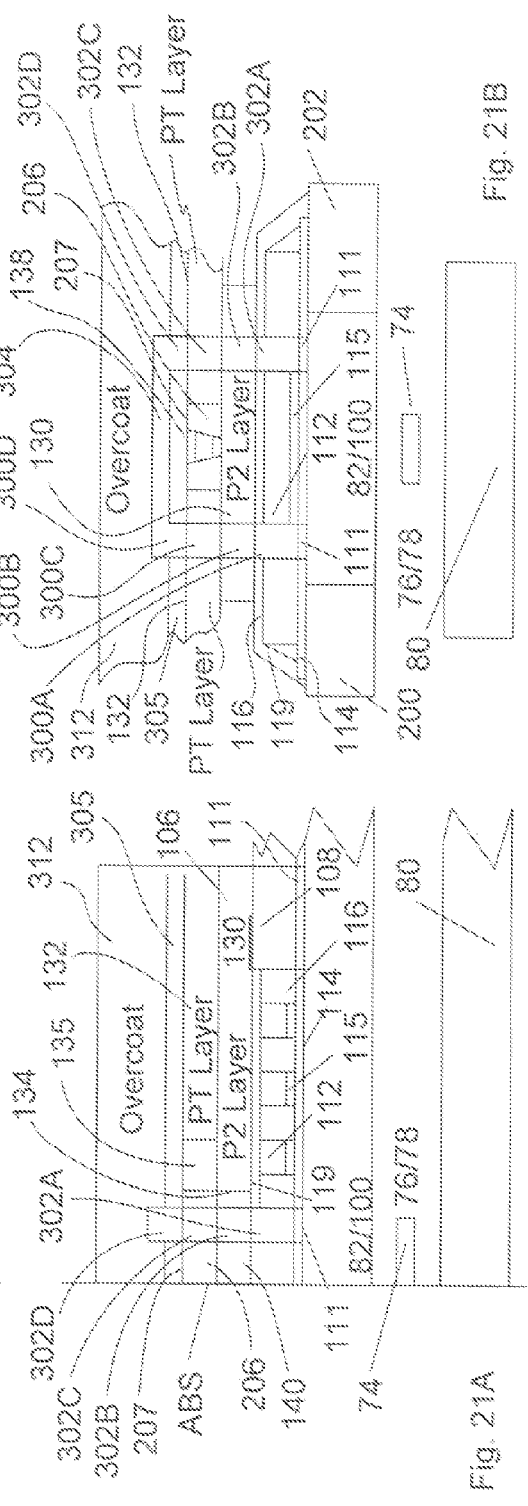

PERPENDICULAR RECORDING MAGNETIC HEAD WITH A WRITE SHIELD MEGNETICALLY COUPLED TO A FIRST POLE PIECE

RELATED APPLICATIONS

This disclosure is a continuation-in-part of U.S. patent application Ser. No. 10/631,642, filed on Jul. 30, 2003, now U.S. Pat. No. 7,031,121, which is hereby incorporated herein by reference.

BACKGROUND OF THE INVENTION

1. Field of the Invention

This disclosure relates to a perpendicular recording magnetic head with a write shield magnetically coupled to a first pole piece and, more particularly, to such a head which employs ferromagnetic studs magnetically coupling the write shield to the first pole piece.

2. Description of the Related Art

The heart of a computer is a magnetic disk drive which includes a rotating magnetic disk, a slider that has write and read heads, a suspension arm and an actuator arm. When the disk is not rotating the actuator arm locates the suspension arm so that the slider is parked on a ramp. When the disk rotates and the slider is positioned by the actuator arm above the disk, air is swirled by the rotating disk adjacent an air bearing surface (ABS) of the slider causing the slider to ride on an air bearing a slight distance from the surface of the rotating disk. When the slider rides on the air bearing the actuator arm positions the write and read heads over selected circular tracks on the rotating disk where field signals are written and read by the write and read heads. The write and read heads are connected to processing circuitry that operates according to a computer program to implement the writing and reading functions.

A write head is typically rated by its areal density, which is a product of its linear bit density and its track width density. The linear bit density is the number of bits, which can be written per linear inch along the track of the rotating magnetic disk and the track width density is the number of tracks that can be written per inch along a radius of the rotating magnetic disk. The linear bit density is quantified as bits per inch (BPI) and the track width density is quantified as tracks per inch (TPI). The linear bit density depends upon the length of the bit along the track and the track width density is dependent upon the width of the second pole tip at the ABS. Efforts over the years to increase the areal density have resulted in computer storage capacities increasing from kilobytes to megabytes to gigabytes.

The magnetic moment of each pole piece of a write head is parallel to the ABS and to the major planes of the layers of the write head. When the write current is applied to the coil of the write head the magnetic moment rotates toward or away from the ABS, depending upon whether the write signal is positive or negative. When the magnetic moment is rotated from the parallel position, magnetic flux fringing between the pole pieces writes a positive or a negative bit in the track of the rotating magnetic disk. As the write current frequency is increased, the linear bit density is also increased. An increase in the linear bit density is desirable in order to increase the aforementioned areal density which increase results in increased storage capacity.

There are two types of magnetic write heads. One type is a longitudinal write head and the other type is a perpendicular recording write head. In the longitudinal recording write head the flux induced into first and second pole pieces by a write coil fringes across a write gap layer, between the pole pieces, into the circular track of the rotating magnetic disk. This causes an orientation of the magnetization in the circular disk to be parallel to the plane of the disk, which is referred to as longitudinal recording. The volume of the magnetization in the disk is referred to as a bit cell and the magnetizations in various bit cells are antiparallel so as to record information in digital form. The bit cell has a width representing track width, a length representing linear density and a depth, which provides the volume necessary to provide sufficient magnetization to be read by a sensor of the read head. In longitudinal recording magnetic disks this depth is somewhat shallow. The length of the bit cell along the circular track of the disk is determined by the thickness of the write gap layer. The write gap layer is made as thin as practical so as to decrease the length of the bit cell along the track, which, in turn, increases the linear bit density of the recording. The width of the second pole tip of the longitudinal write head is also made as narrow as possible so as to reduce the track width and thereby increase the track width density. Unfortunately, the reduction in the thickness of the write gap layer and the track width is limited because the bit cell is shallow and there must be sufficient bit cell volume in order to produce sufficient magnetization in the recorded disk to be read by the sensor of the read head.

In a perpendicular recording write head there is no write gap layer. The second pole piece has a pole tip with a width that defines the track width of the write head and a wider yoke portion, which delivers the flux to the pole tip. At a recessed end of the pole tip the yoke flares laterally outwardly to its full width and thence to a back gap, which is magnetically connected to a back gap of a first pole piece. The perpendicular write head records signals into a perpendicular recording magnetic disk, which is significantly thicker than a longitudinal recording magnetic disk. In the perpendicular recording magnetic disk a soft magnetic layer underlies a thicker perpendicular recording layer that has a high saturation magnetization Ms and a high coercivity $H_c$. The thicker disk permits a larger bit cell so that the length and the width of the cell can be decreased and still provide sufficient magnetization to be read by the read head. This means that the width and the thickness or height of the pole tip at the ABS can be reduced to increase the aforementioned TPI and BPI. The magnetization of the bit cell in a perpendicular recording scheme is perpendicular to the plane of the disk as contrasted to parallel to the plane of the disk in the longitudinal recording scheme. The flux from the pole tip into the perpendicular recording magnetic disk is in a direction perpendicular to the plane of the disk, thence parallel to the plane of the disk in the aforementioned soft magnetic underlayer and thence again perpendicular to the plane of the disk into the first pole piece to complete the magnetic circuit.

Experimental evidence and modeling have shown that a trailing edge write shield improves the derivative of the head field dHy/dx and increases the longitudinal field at the writing location. These features improve transition sharpness (linear resolution) and permit higher coercive field media (improved stability). Initial discussion of a perpendicular pole head with trailing edge shields (and leading edge shields) and its advantages was published by A. S. Hoagland of IBM in "High resolution magnetic recording structures", IBM Journal of Research and Development, 1958 (2) pp. 90-104. That head was fabricated from laminated HiMu8O sheets and hand wound coils. This would be difficult to manufacture at the dimensions needed for today's recording densities. In addition, M. Mallary obtained U.S. Pat. No. 4,656,546, "Vertical magnetic recording arrangement", reissued as U.S. Pat. No. RE 03,3949 for a pole head in which a single writing pole is followed by a pancake coil and a large cross-section element which serves as both a trailing shield and return pole for flux closure. This design was appropriate before magnetoresistive read heads were in common use. If a shielded magnetoresistive read head is built below the write pole in this design, undesirable writing will take place under the shields of the read head, which will assume approximately the same magnetomotive potential as the writing pole. Moreover, M. Mallary, A. Torobi and M. Benaldi of Maxtor described in paper WA-02 at the North American Perpendicular Magnetic Recording Conference, Jan. 9, 2002, a perpendicular pole with a trailing shield and also side shields. This head is workable with a leading magnetoresistive head structure because two pancake coils are used to ensure that the read head is at the same magnetomotive potential as the trailing shield pole and the soft underlayer of the medium. A disadvantage of this design is that it requires two pancake coils. It also requires a relatively thick return pole, which will have to be made of high moment material for the desirable high write field capability, and a very narrow throat height for that element. This design will also result in write disturb of the read shields.

A perpendicular recording write head has been developed using damascene processes. However, because of the accuracies needed, a head fabricated using damascene processes does not provide the accuracies needed for geometries and materials required today.

It can be seen then that there is a need for a method for forming a perpendicular recording magnetic head with a write shield magnetically coupled to a first pole piece with greater manufacturing tolerances.

SUMMARY OF THE INVENTION

To overcome the limitations described above, and to overcome other limitations that will become apparent upon reading and understanding the present specification, the present invention discloses a method for forming a perpendicular recording magnetic head with a write shield magnetically coupled to a first pole piece.

The present invention solves the above-described problems by using ion milling to form the write pole.

A system in accordance with the principles of the present invention includes a first and second ferromagnetic pole piece, the second pole piece with a front end recessed from the ABS and magnetically connected to a back gap magnetically coupling the first and second pole pieces, a coil structure between the first and second ferromagnetic pole piece, a write pole sub layer, formed over the second pole piece, the write pole sub layer having a taper at a pole tip region toward the air bearing surface (ABS), a magnetic material disposed on top of the write pole sub layer, a laminated write pole layer, formed over the write pole sub layer, the laminated write pole layer formed of high magnetic saturation material with interspersed non-magnetic film magnetically coupled with the write pole sub layer, a laminated write pole shaped from the laminated write pole layer, a non-magnetic material encapsulating the write pole, a ferromagnetic write shield layer disposed over the non-magnetic material encapsulating the write pole and at least one ferromagnetic stud magnetically connecting the first pole piece and the write shield layer.

In another embodiment of the present invention, a magnetic head assembly that has a head surface, a read head and a perpendicular recording write head is disclosed. The magnetic head assembly includes a read head including ferromagnetic first and second shield layers and a read sensor located between the first and second shield layers; and a perpendicular recording write head including a first and second ferromagnetic pole piece, the second pole piece with a front end recessed from the ABS and magnetically connected to a back gap magnetically coupling the first and second pole pieces, a coil structure between the first and second ferromagnetic pole piece, a write pole sub layer, formed over the second pole piece, the write pole sub layer having a taper at a pole tip region toward the air bearing surface (ABS), a magnetic material disposed on top of the write pole sub layer, a laminated write pole layer, formed over the write pole sub layer, the laminated write pole layer formed of high magnetic saturation material with interspersed non-magnetic film magnetically coupled with the write pole sub layer, a laminated write pole shaped from the laminated write pole layer, a non-magnetic material encapsulating the write pole, a ferromagnetic write shield layer disposed over the non-magnetic material encapsulating the write pole and at least one ferromagnetic stud magnetically connecting the first pole piece and the write shield layer.

In another embodiment of the present invention, a method of making a perpendicular recording write head is disclosed. The method includes forming a first and second ferromagnetic pole piece, the second pole piece with a front end recessed from the ABS and magnetically connected to a back gap magnetically coupling the first and second pole pieces, forming a coil structure between the first and second ferromagnetic pole piece, forming, over the second pole piece, a write pole sub layer having a taper at a pole tip region toward the air bearing surface (ABS), forming a magnetic material on top of the write pole sub layer, forming, over the write pole sub layer, a laminated write pole layer of high magnetic saturation material with interspersed non-magnetic film magnetically coupled with the write pole sub layer, shaping a laminated write pole from the laminated write pole layer using reactive ion etching, encapsulating the write pole in a non-magnetic material, forming a ferromagnetic write shield layer over the non-magnetic material encapsulating the write pole and forming at least one ferromagnetic stud magnetically connecting the first pole piece and the write shield layer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 11A and 11B illustrate the fabrication of the first and second shield layers;

FIGS. 12A and 12B illustrate the formation of the write coils;

FIGS. 13A and 13B illustrates the formation of the first pole piece, the back gap and first stud segments;

FIGS. 14A and 14B illustrate the formation of the write pole sub layer, and hard mask layer;

FIGS. 15A and 15B illustrate the formation of the laminated write pole;

FIG. 18A and 18B show the formation of the third stud segments;

FIGS. 19A and 19B show the lift-off approach for fabricating the trailing shield and the fourth stud segments;

FIG. 20A and 20B show the seed-layer approach for fabricating the trailing shield and the fourth stud segments; and FIGS. 21A and 21B show the formation of the overcoat over the trailing shield.

DETAILED DESCRIPTION OF THE INVENTION

Magnetic Disk Drive

Figure 1:
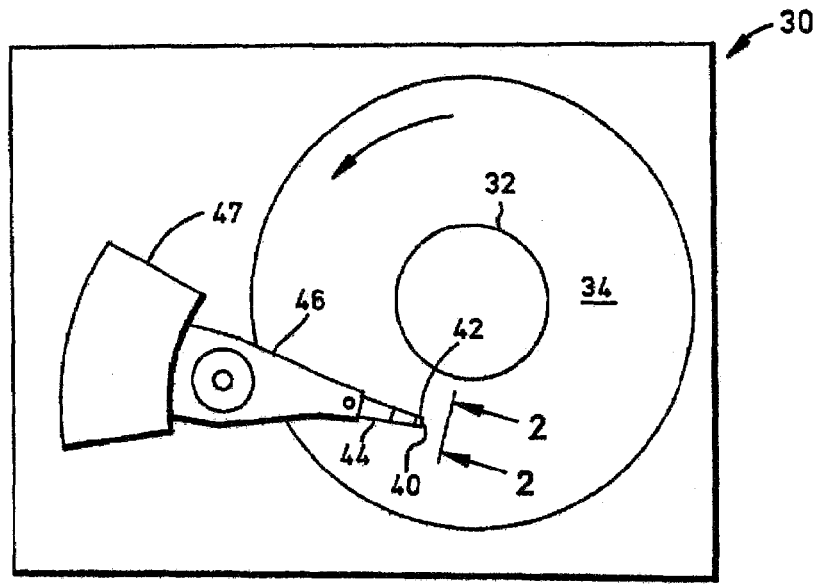
FIG. 1 is a plan view of an exemplary prior art magnetic disk drive.
Figure 2:
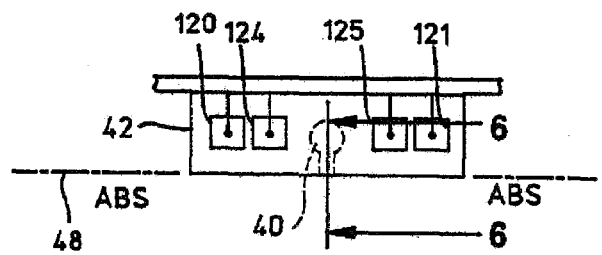
FIG. 2 is an end view of a prior art slider with a magnetic head of the disk drive as seen in plane 2-2 of FIG. 1.
Figure 3:
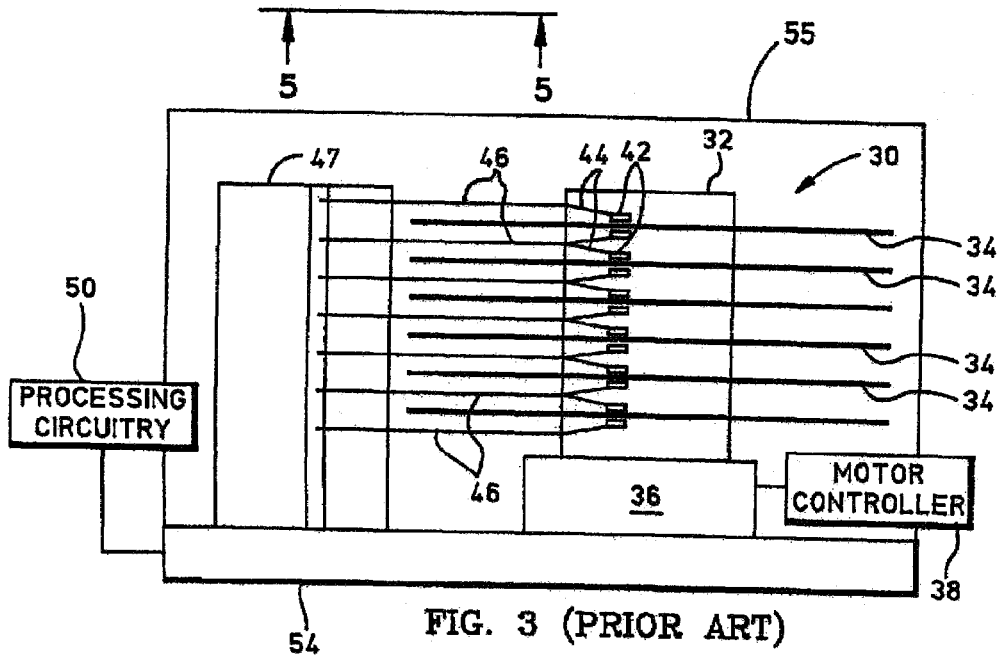
FIG. 3 is an elevation view of the prior art magnetic disk drive wherein multiple disks and magnetic heads are employed.

Referring now to the drawings wherein like reference numerals designate like or similar parts throughout the several views, FIGS. 1-3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34.

Figure 4:
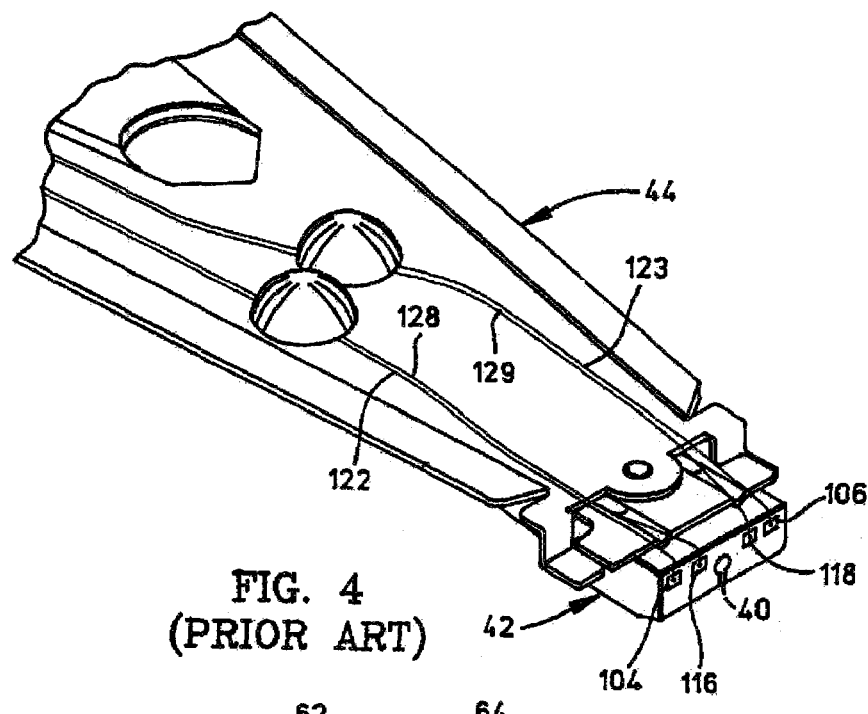
FIG. 4 is an isometric illustration of an exemplary prior art suspension system for supporting the slider and magnetic head.

When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
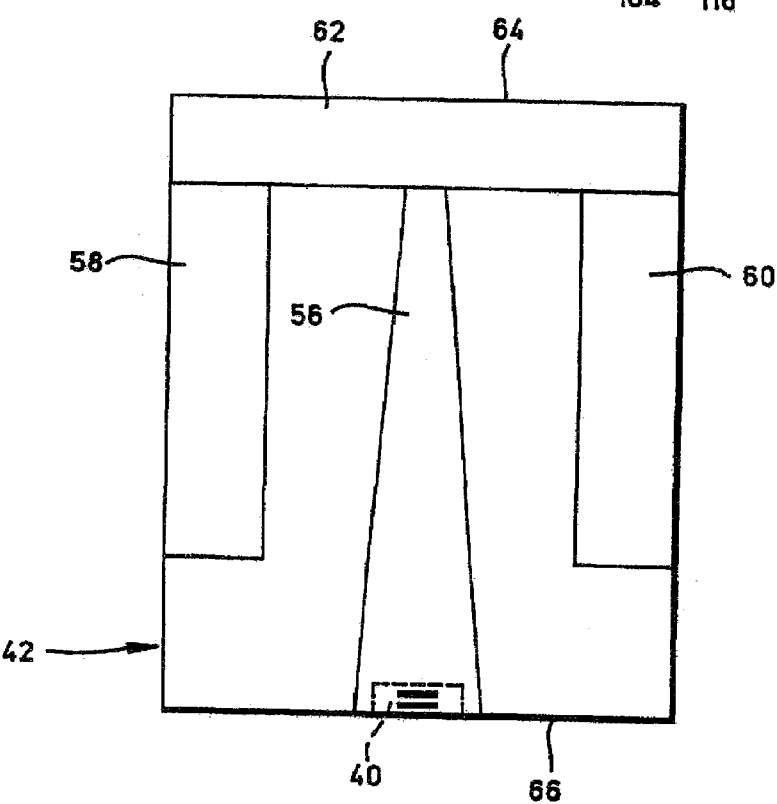
FIG. 5 is an ABS view of the magnetic head taken along plane 5-5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
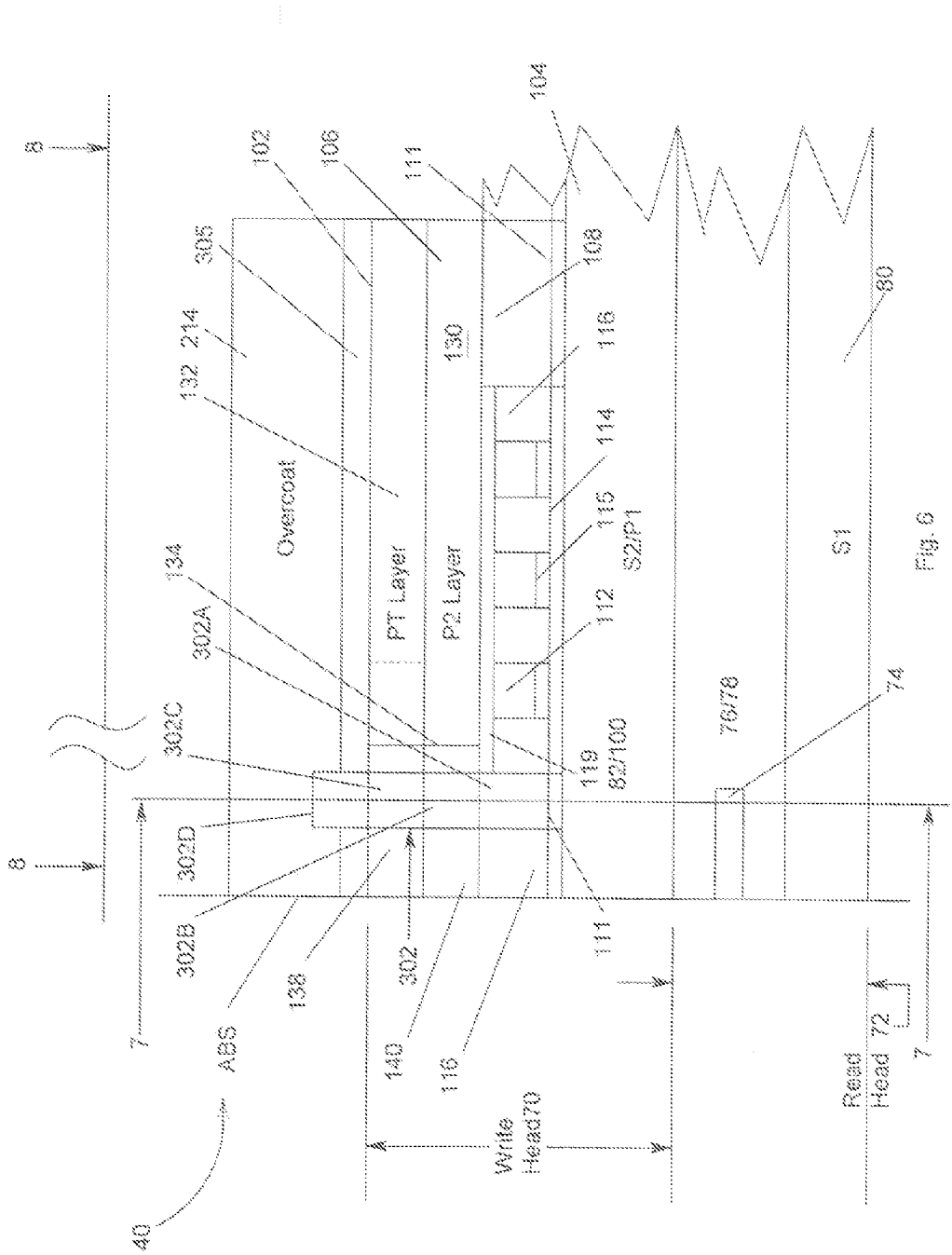
FIG. 6 is a longitudinal cross-sectional view of the slider taken along plane 6-6 of FIG. 2 showing the present perpendicular recording head in combination with a read head.
Figure 7:
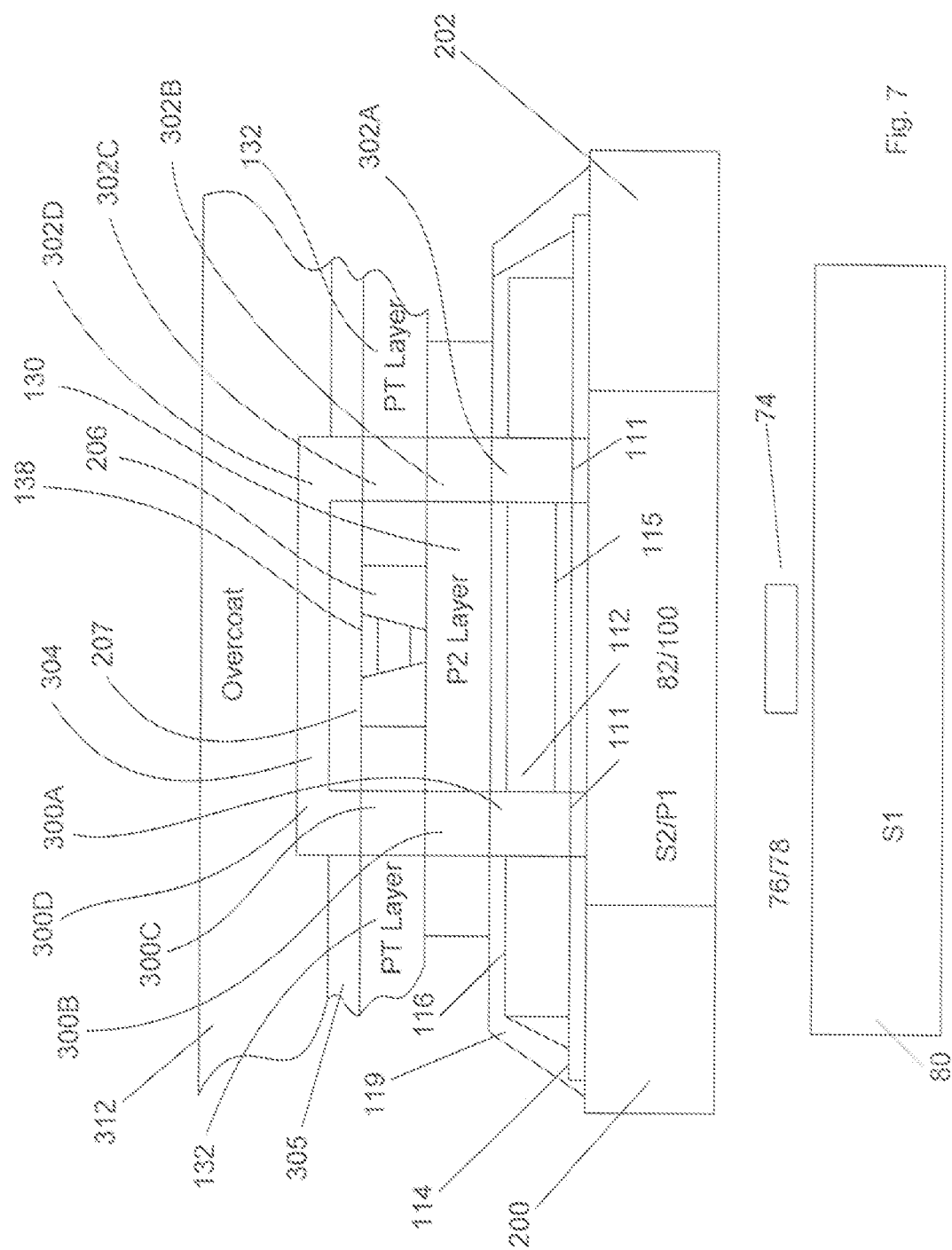
FIG. 7 is an ABS view of the slider taken along plane 7-7 of FIG. 6.

FIG. 6 is a side cross-sectional elevation view of a merged magnetic head assembly 40, which includes a write head portion 70 and a read head portion 72, the read head portion employing a read sensor 74. FIG. 7 is an ABS view of FIG. 6. The sensor 74 is sandwiched between nonmagnetic electrically nonconductive first and second read gap layers 76 and 78, and the read gap layers are sandwiched between ferromagnetic first and second shield layers 80 and 82. In response to external magnetic fields, the resistance of the sensor 74 changes. A sense current (not shown) conducted through the sensor causes these resistance changes to be manifested as potential changes. These potential changes are then processed as readback signals by the processing circuitry 50 shown in FIG. 3.

As shown in FIGS. 6 and/or 7, the write head portion 70 includes first and second pole pieces 100 and 102 which extend from the ABS to back gap portions 104 and 106 which are recessed in the head and which are magnetically connected to a back gap layer 108. The second pole piece 102 may include a bottom recessed second pole piece layer (P2 layer) 130 and a top leading edge taper pole tip layer (PT layer) 132.

Located between the first and second pole pieces 100 and 102 is an insulation layer 116 which extends from the ABS to the back gap layer 108 and has embedded therein at least one write coil layer 112. A bottom insulation layer 114 insulates the write coil from the first pole piece 100. An alumina layer 119 is located between the coil layer and the ABS. A seed-layer 115 is formed over the insulation layer 114 for forming the coil.

Figure 8:
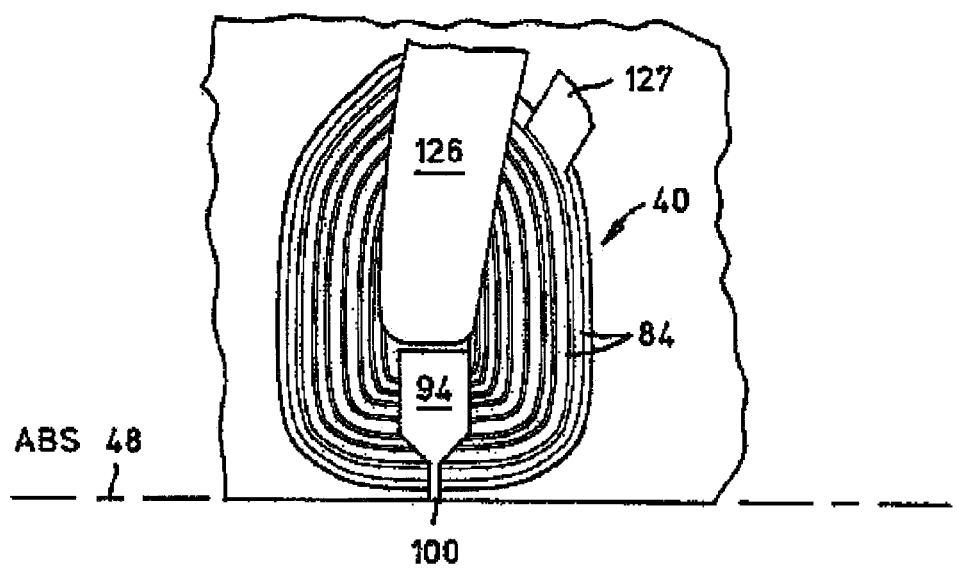
FIG. 8 is a view taken along plane 8-8 of FIG. 6 with all material above the coil layer and leads removed.

Since the second shield layer 82 and the first pole piece layer 100 are a common layer the head is known as a merged head. In a piggyback head the second shield layer and the first pole piece layer are separate layers, which are separated by a nonmagnetic layer. As shown in FIGS. 2 and 4, first and second solder connections 120 and 121 connect leads (not shown) from the sensor 74 to leads 122 and 123 on the suspension 44, and third and fourth solder connections 124 and 125 connect leads 126 and 127 from the coil 84 (see FIG. 8) to leads 128 and 129 on the suspension.

Figure 9:
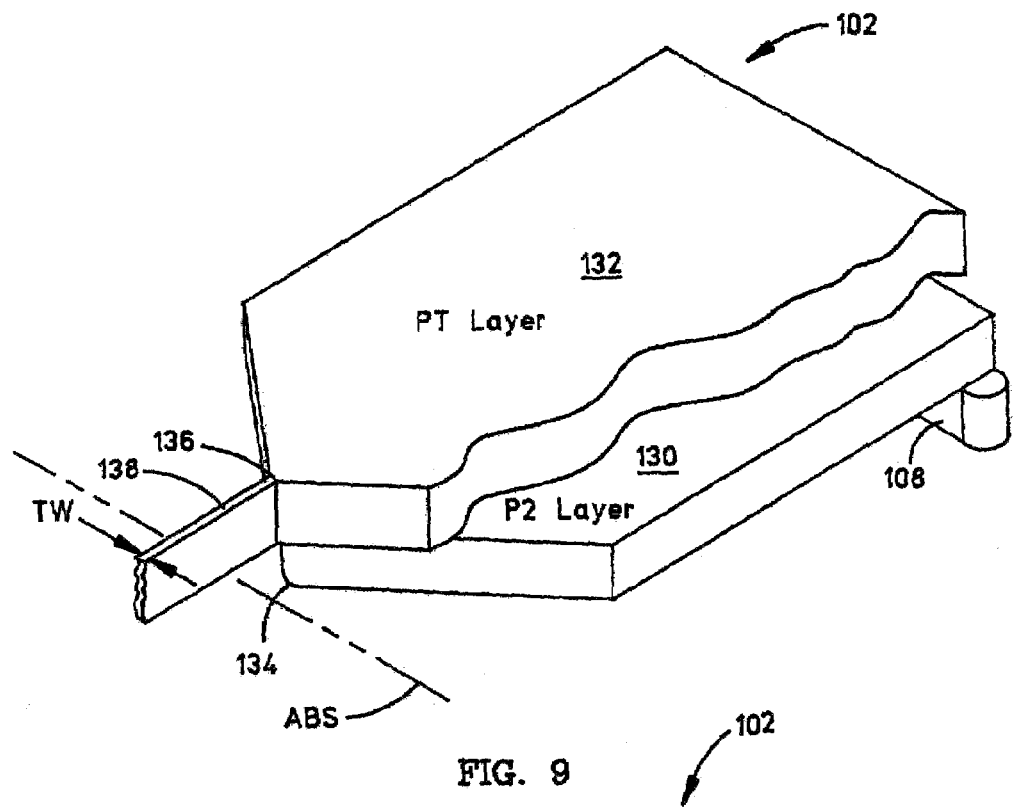
FIG. 9 is an isometric view of a second pole piece of FIG. 6, which includes a bottom pole piece and a top pole tip layer.
Figure 10:
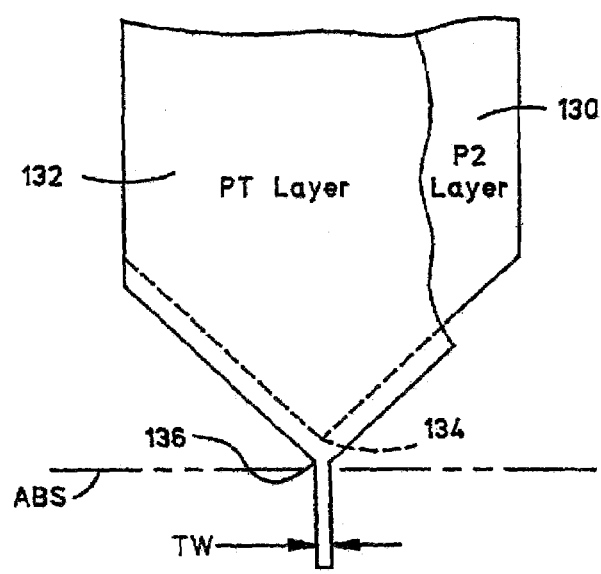
FIG. 10 is a top view of FIG. 9.

As shown in FIGS. 9 and 10, the second pole piece 102 includes the bottom second pole piece (P2) layer 130 and the top ferromagnetic pole tip (PT) layer 132. The layers 130 and 132 have flare points 134 and 136 where the layers first commence to extend laterally outwardly after the ABS. The pole tip layer 132 has a pole tip 138 and a yoke, which is, located between the pole tip 138 and the back gap 108 (see FIG. 6).

The width of the pole tip 138 is the track width (TW) of the recording head. The pole tip 138 is shown extended forward of the ABS in FIGS. 9 and 10 since this is its configuration when it is partially constructed on a wafer where rows and columns of magnetic head assemblies are fabricated. After completion of the magnetic head assemblies, which will be discussed hereinafter, the head assemblies are diced into rows of magnetic head assemblies and lapped to the ABS shown in FIG. 6. Each row of magnetic head assemblies is then diced into individual head assemblies and mounted on the suspensions, as shown in FIG. 3.

An insulation layer (not shown in FIGS. 6-7, see FIG. 14A) is located between the flare point 134 and the ABS. The insulation layer 140 is not a write gap layer as employed in a longitudinal recording head. In contrast, flux signals magnetize the bit cells in the recording disk in a perpendicular direction with the flux from the pole tip 138 returning to the first pole piece 100 via a soft magnetic layer in a perpendicular recording disk.

It should be noted that when the second pole piece layer 130 (P2 layer) is employed, as shown in FIG. 9, the length of the head assembly 40 between the ABS and the back gap 108 can be shortened so that the write coil frequency can be increased for further increasing the linear bit density of the write head. It should also be understood that the magnetic head assembly may include multiple write coil layers which are stacked one above the other instead of a single write coil layer, as shown in FIG. 6, and still be within the spirit of the invention.

As shown in FIGS. 6 and/or 7, ferromagnetic studs 300 and 302 are magnetically connected between the first pole piece layer 100 and a ferromagnetic write shield 304. As can be seen from FIG. 6, the studs are located between the coils 112 and the ABS, but can also be exposed at the ABS. As shown in FIG. 7, the direction of travel of the magnetic medium, which may be a disk, is from the bottom to the top of the paper. Accordingly, the write shield 304 is a trailing shield and the read head, including the sensor 74, is a leading read head.

Each of the studs 300 and 302 may be constructed in four separate processing steps which results in the stud 300 having stud segments 300A, 300B, 300C and 300D and the stud 302 having stud segments 302A, 302B, 302C and 302D. These fabrication steps will be described in detail herein below. An insulation layer 305, which may be alumina, is located between the write shield 304 and the write pole tip (PT) layer 132.

Method of Making

FIGS. 11A and 11B to FIGS. 21A and 21B illustrate various steps in the fabrication of the magnetic head assembly 40 shown in FIGS. 6 and 7. In FIGS. 11A and 11B the first and second shield layers 80 and 82 may be fabricated by well-known frame plating techniques and the first and second read gap layers 76 and 78 and the sensor 74 may be fabricated by well-known vacuum deposition techniques.

In FIGS. 12A and 12B a thick alumina layer is deposited (not shown) and the thick alumina is planarized by chemical mechanical polishing (CMP) back to expose the top of the first pole piece layer (P1) 100 and leaving alumina layers 200 and 202 on each side of the first pole piece layer (P1) as shown in FIG. 12B. Next, a seed-layer 111 is formed for plating stud segments 300A and 302A, and back gap 108. The stud segments 300A and 302A and the back gap 108 are simultaneously formed over the seed-layer 111. The exposed seed-layer 111 is then removed. After the seed-layer 111 is removed, an insulation layer 114, such as alumina, is deposited for insulating a subsequent write coil layer 112 from the first pole piece layer 100. A seed-layer 115 is formed over the insulation layer 114 for forming the coil. The write coil layer 112 is formed in two photolithography steps. First, photolithography is used to fabricate the electrical connections such as the side and center taps (not shown in FIGS. 12A and 12B) of the coil 112. The side and center taps, although not shown are plated to about the height of studs 300A and 302A, and back gap 108. The second photolithography step is to fabricate the rest of the coil structure 112. The thickness of the coil structure 112 is not as thick as studs 300A and 302A, and back gap 108 as shown in FIGS. 12A and 12B. The write coil layer 112 is fabricated on the common seed-layer 115. After removal of the exposed seed-layer 115, the coil 112 is insulated by insulation 116 which may be baked photoresist. The baked photoresist 116 is partly removed by reactive ion etching to thinning. Then a thick layer of alumina 119 is deposited slightly above the height of studs 300A and 302A, and back gap 108 and patterned so as to leave the tops of the back gap 108, center and side taps (not shown) of the coil 112, and the stud segments 300A and 302A exposed. Back gap 108 and studs 300A and 302A, and alumina layer 119 are at the same height. Alumina 119 is used to passivate the coil 112 and underlayer structures from the potential damages from ion mill during the write pole formation.

In FIGS. 13A and 13B there is simultaneously formed the second pole piece (P2) layer 130 with a front end 134 which is recessed from the ABS and the back gap portion 106 which is magnetically connected to the back gap 108 and stud segments 300B and 302B.

In FIGS. 14A and 14B a thick alumina layer 140 is deposited and CMP flat leaving the alumina layer 140 between the front end 134 of the second pole piece layer 130 and the ABS and leaving the tops of the second pole piece layer 130, back gap portion 106, and stud segments 300B and 302B exposed.

A non-magnetic sacrificial layer 140 such Ta or $Al_2O_3$ is patterned by ion mill or reactive ion etching to form a write pole tip layer 132 and is preferably formed with a taper 135 at a pole tip region, which is toward the air bearing surface (ABS). A magnetic material is deposited on top of the second pole piece layer 130 and planarized by chemical mechanical polishing (CMP) to expose the top surface of non-magnetic sacrificial layer 140 (Ta or $Al_2O_3$).

A write pole 138 is magnetically connected with the write pole tip layer 132. The write pole 138 is preferably formed of lamination layers of a high magnetic saturation material (high $B_{sat}$) such as CoFe, NiFe, or their alloys with interspersed non-magnetic film such as Cr, Ru, etc.

A hard mask layer 203 of a CMP stop layer 204 and an ion mill mask 205 is formed on top of the lamination layers 138. An image of the write pole 138 is formed on top of a hard mask layer 203.

Referring to FIGS. 15A and 15B, reactive ion etching (RIE) is used to image transfer the image of the write pole 138 into the hard mask layer 203. Ion milling is subsequently used to image transfer the image of the write pole 138 into the lamination layers and define the x-direction of the write pole tip layer 132 and taper 135. The write pole 138 is formed with a trapezoidal shape to prevent adjacent track writing when the head experiences skew while flying over the disk. The layers of the write pole 138 are encapsulated by a non-magnetic material 206. The non-magnetic material 206 may be a RIEable material such as $TaO_x$, $SiO_2$, $Si_3N_4$, Ta, W, $Al_2O_3$, etc. The thickness of the non-magnetic layer 206 is at a level about equal to the beginning of the hard mask layer 203.

Figure 16A:
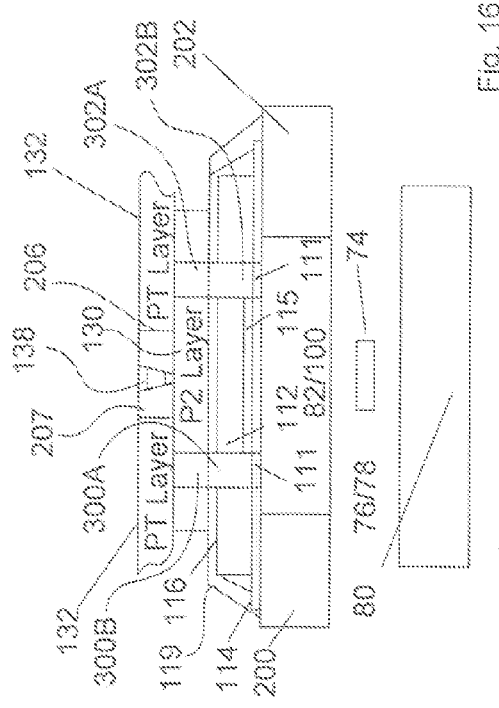
FIGS. 16A and 16B show the removal of the hard mask and exposure of the top of the write pole.
Figure 16B:
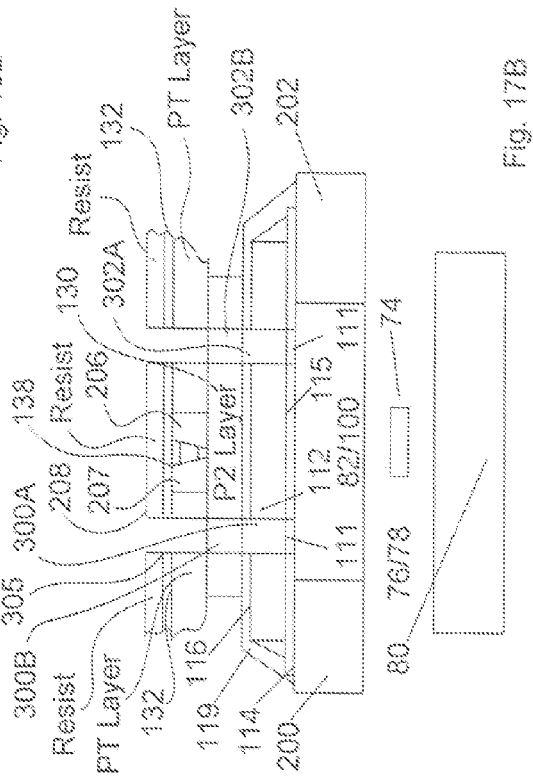

Referring to FIGS. 16A and 16B, it is optional to deposit a CMP stop layer 207 after depositing the encapsulating non-magnetic layer 206 for better CMP control. Then, CMP is used to remove the hard mask 203 (shown in FIGS. 15A and 15B), re-deposition and fencing during the ion milling to planarize and expose the top of the write pole 138.

Figure 17A:
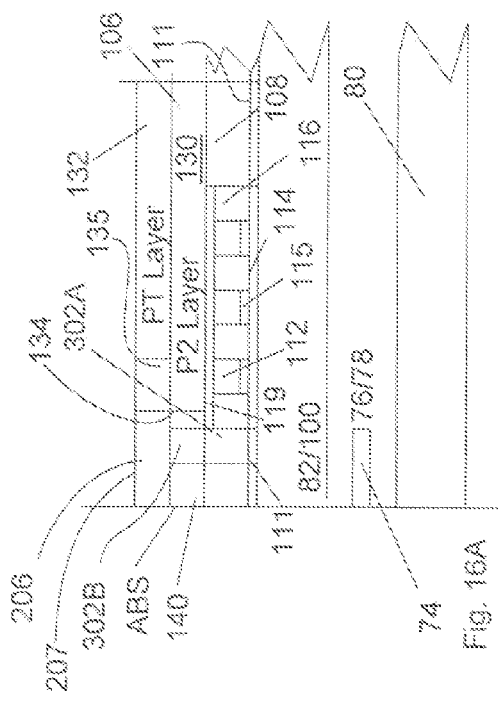
FIG. 17A and 17B show the formation of the layer of non-magnetic materials (write gap) and a patterned photoresist layer for forming the third stud segments.
Figure 17B:
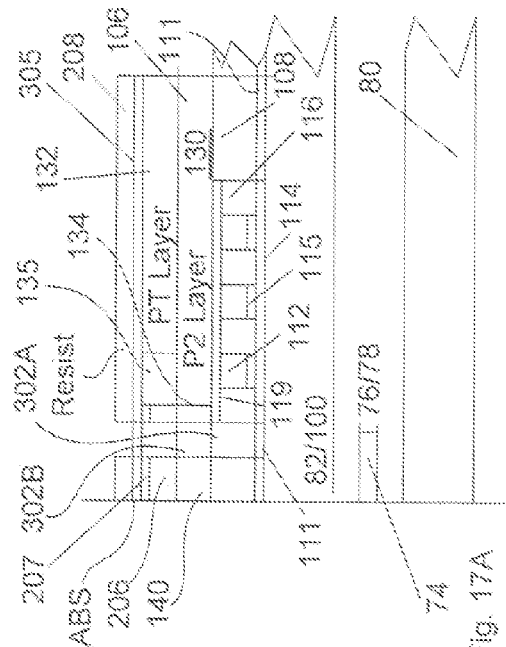

In FIGS. 17A and 17B the layer of non-magnetic materials (write gap) preferably a RIEable material such as $TaO_x$, $SiO_2$, $Si_3N_4$, Ta, W, $Al_2O_3$, etc. 305 is sputter deposited on the tops of the write pole layer. The write gap 305 and non-magnetic layer 206 are preferable of the same material.

The next step is to fabricate the studs and the trailing shield. A photo step is used to define the stud photo on top of the write gap 305. A photoresist layer 208 is patterned to define a shape of the stud segments 300C and 302C (shown in FIGS. 18A and 18B). In FIGS. 17A and 17B, a reactive ion etch is implemented into the layer of non-magnetic materials 305 and non-magnetic layer 206 for producing openings for the stud segments 300C and 302C. In FIGS. 18A and 18B, stud segments 300C and 302C are filled in to make magnetic connection to stud segments 300B and 302B.

There are two approaches to fabricate the trailing shield 304 and stud segments 300D and 302D. The first approach is a lift-off approach. FIGS. 19A and 19B show the lift-off approach, wherein a trailing shield photo expose is formed on top of the write gap 305 using a bi-layer resist, a full-film deposition of magnetic material to form stud segments 300D and 302D and trailing shield 304. The bi-layer resist is removed by lift-off (not shown in FIGS. 19A and 19B).

FIGS. 20A and 20B show the seed-layer approach. A seed-layer is deposited on top of the write gap 305 followed by photo and plating. The seed-layer is then removed. The choice of method may be based on the aspect ratio of the trailing shield that is desired. FIGS. 21A and 21B show the overcoat 312 being deposited.

Discussion

It should be understood that vacuum deposition may be employed in lieu of the aforementioned frame plating step. Further, in a broad concept of the invention the pole tip layer can be employed without the aforementioned bottom second pole piece layer. The materials of the various layers are optional in some instances. For instance, photoresist may be employed in lieu of the alumina layers and vice versa. Further, while the magnetic head is planarized at various steps, planarization may occur only for the second pole piece and pole tip layers. Further, the magnetic head assembly may be a merged or piggyback head, as discussed hereinabove. The pole pieces are ferromagnetic materials, which may be nickel iron. It should be noted that the second pole piece layer may be a different ferromagnetic material than the pole tip layer. For instance, the second pole piece layer may be $Ni_5Fe_{55}$ and the pole tip layer may be $Co_{90}Fe_{10}$.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A perpendicular recording write head, comprising:
   a first ferromagnetic pole layer having opposite proximal and distal ends, the proximal end terminating at an air-bearing surface;
   a back gap layer formed on the first ferromagnetic pole layer at the distal end;
   a second ferromagnetic pole layer having a first end recessed from the air-bearing surface and a second end coupled to the back gap layer;
   a coil structure formed between the first and second ferromagnetic pole layers, the coil structure being encapsulated by a non-magnetic material;
   a third ferromagnetic pole layer formed on the second ferromagnetic layer having a tapered tip proximate a pole tip region, the tapered tip recessed from the air-bearing surface;
   a laminated write pole tip layer formed coplanar to and adjacent the third ferromagnetic pole layer for providing a flux path from the third ferromagnetic pole layer to the air-bearing surface;
   a non-magnetic material configured to completely encircle and encapsulate the laminated write pole tip layer on four sides, the non-magnetic material being formed between the laminated write pole tip layer and the first ferromagnetic pole layer, on a first and second side of the laminated write pole tip layer and on a top side of the laminated write pole tip layer;
   a ferromagnetic write shield layer formed over the non-magnetic material disposed on the top side of the laminated write pole tip layer, the ferromagnetic write shield layer being physically isolated from the laminated write pole tip layer and the third write pole layer; and
   a first and a second ferromagnetic stud formed at the sides of the laminated write pole tip layer, the first and a second ferromagnetic stud further connecting the first pole piece and the write shield layer for providing in-line and side magnetic shields.

2. The perpendicular recording write head of claim 1, wherein the laminated write pole tip layer further comprises a trapezoidal shape to prevent adjacent track writing when skew is experienced while flying over the disk.

3. The perpendicular recording write head of claim 1, wherein the laminated write pole includes a tapered portion.

4. The perpendicular recording write head of claim 1, wherein the non-magnetic material is selected from a group of materials comprising $TaO_x$, $SiO_2$, $Si_3N_4$, Ta, W, $Al_2O_3$.

5. The perpendicular recording write head of claim 1, wherein the write shield layer further comprising a trailing write shield layer.

6. A magnetic head assembly that has a head surface, a read head and a perpendicular recording write head, comprising:
   the read head including:
      ferromagnetic first and second shield layers; and
      a read sensor located between the first and second shield layers; and
   the perpendicular recording write head including:
      a first ferromagnetic pole layer having opposite proximal and distal ends, the proximal end terminating at an air-bearing surface;
      a back gap layer formed on the first ferromagnetic pole layer at the distal end;
      a second ferromagnetic pole layer having a first end recessed from the air-bearing surface and a second end coupled to the back gap layer;
      a coil structure formed between the first and second ferromagnetic pole layers, the coil structure being encapsulated by a non-magnetic material;
      a third ferromagnetic pole layer formed on the second ferromagnetic layer having a tapered tip proximate a pole tip region, the tapered tip recessed from the air-bearing surface;
      a laminated write pole tip layer formed coplanar to and adjacent the third ferromagnetic pole layer for providing a flux path from the third ferromagnetic pole layer to the air-bearing surface;
      a non-magnetic material configured to completely encircle and encapsulate the laminated write pole tip layer on four sides, the non-magnetic material being formed between the laminated write pole tip layer and the first ferromagnetic pole layer, on a first and second side of the laminated write pole tip layer and on a top side of the laminated write pole tip layer;

a ferromagnetic write shield layer formed over the nonmagnetic material disposed on the top side of the laminated write pole tip layer, the ferromagnetic write shield layer being physically isolated from the laminated write pole tip layer and the third write pole layer; and a first and a second ferromagnetic stud formed at the sides of the laminated write pole tip layer, the first and a second ferromagnetic stud further connecting the first pole piece and the write shield layer for providing in-line and side magnetic shields.

7. The magnetic head assembly of claim 6, wherein the laminated write pole tip layer further comprises a trapezoidal shape to prevent adjacent track writing when skew is experienced while flying over the disk.

8. The magnetic head assembly of claim 6, wherein the laminated write pole includes a tapered portion.

9. The magnetic head assembly of claim 6, wherein the non-magnetic material is selected from a group of materials comprising $TaO_x$, $SiO_2$, $Si_3N_4$, Ta, W, $Al_2O_3$.

10. The magnetic head assembly of claim 6, wherein the write shield layer further comprising a trailing write shield layer.

* * * * *